United States Patent

[11] 3,602,187

| | | |
|---|---|---|
| [72] | Inventor | Theodore Lambiris<br>Walled Lake, Mich. |
| [21] | Appl. No. | 58,554 |
| [22] | Filed | July 27, 1970 |
| [45] | Patented | Aug. 31, 1971 |
| [73] | Assignee | General Motors Corporation<br>Detroit, Mich. |

[54] TRANSMISSION CONTROL INDICATOR
5 Claims, 3 Drawing Figs.

[52] U.S. Cl. ................................................ 116/124,
340/54
[51] Int. Cl. .................................................. G09f 9/00
[50] Field of Search .......................................... 116/114,
116, 124, 133, 136.5, 129; 74/483, 484;
200/61.54; 340/54

[56] References Cited
UNITED STATES PATENTS

| 2,254,242 | 9/1941 | Righi | 116/129 |
| 2,737,147 | 3/1956 | Bliss | 116/124 |
| 3,015,951 | 1/1962 | Ochs, Jr. | 116/136.5 UX |
| 3,183,884 | 5/1965 | Daniels | 116/124 |
| 3,231,857 | 1/1966 | Miller | 340/54 |
| 3,319,598 | 5/1967 | DeLorean | 116/124 |

*Primary Examiner*—Louis J. Capozi
*Attorneys*—W. E. Finken, A. M. Heiter and Charles R. White ABSTRACT: Transmission control indicator in which an indicator pointer is secured directly to a transmission control tube having limited rotation with respect to a pivot axis. The pointer has a pivot joint adjacent to the tube below an indicator shift quadrant having indications of transmission operating modes. There is a sliding pivotal connection for connecting the extending end of the pointer above the shift quadrant so that the sweep of the pointer is reduced allowing a more compact shift quadrant. In the preferred embodiment the sliding pivotal connection point is in a vertical plane parallel to plane containing the pivot axis of the control tube to centralize the point of convergence of predetermined pointer positions. A hollow support tube connecting the indicator housing to an instrument panel provides a light passage to improve illumination of the pointer and shift quadrant.

PATENTED AUG 31 1971　　　　　　　　　3,602,187

INVENTOR.
Theodore Lambiris
BY Charles L. White
ATTORNEY

TRANSMISSION CONTROL INDICATOR

This invention relates to indicators and more particularly to improvement in transmission control indicators having a pointer member, coupled to a transmission control, mounted for sliding pivotal movement above a shift quadrant or dial suitably marked to indicate transmission operation.

In modern vehicle instrumentation it is often desirable to group the various instruments pertaining to the vehicle and its operation in a compact cluster in the instrument panel to facilitate their observation and enhance their usefulness. The instrumentation usually includes an indicator for automatic transmissions having a shift quadrant with appropriate markings thereon corresponding to transmission operating ranges such as low, second, drive, neutral, reverse and park. Cooperating with the shift quadrant is an indicator needle or pointer which is swept across the markings by corresponding rotational movement of a manually actuated shift tube or other mechanism to inform the vehicle operator of the operational setting for the transmission.

In view of the fact that there is only limited space available for instrumentation, it is often impractical to have a pointer extending radially from the shift tube on to the dial because the pointer would sweep through a large arc and require an excessively large shift quadrant.

In the prior art, various arrangements have been made to couple an indicator needle to the shift tube by special linkages so that the arc swept by the pointer is substantially reduced. However, most of these prior art arrangements are fairly complex, expensive and relatively difficult to install and adjust. Many prior transmission indicators require many parts including cable actuators connected to a control tube and return springs to move the pointer to the park position when the manual lever is employed to condition the transmission for park.

With this invention a straight-forward transmission control is provided utilizing a minimum number of parts thereby reducing the complexity and costs of transmission control indicators. This invention features a new and improved transmission control indicator having an advanced pointer mechanism or needle with reduced sweep and a cooperating shift quadrant arrangement with markings corresponding to various pointer positions spaced to facilitate viewing of the shift quadrant. The pointer mechanism is preferably a one-piece member, operated by a transmission control shift tube, having a sliding pivotal connection within the indicator housing. This connection is outwardly of the indicator shift quadrant and the rotational axis of the shift tube. The indicator housing has a new and improved fastener connection with the instrument housing that also facilitates the illumination of the interior of the indicator housing, the pointer mechanism and shift quadrant.

These and other objects, benefits and features of this invention will become more apparent from the following detailed description and drawing in which.

Figure 1:
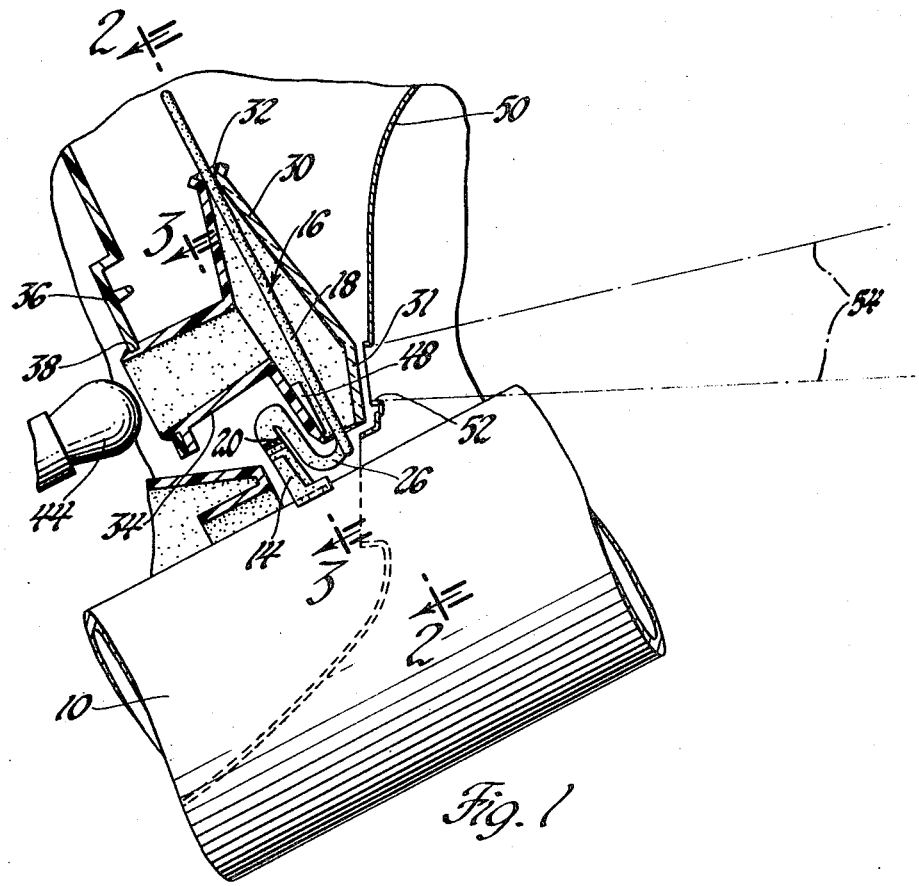
FIG. 1 is a side view partly in section of a vehicle instrument panel with a transmission control indicator and a steering column mounted transmission control tube.

As shown in the drawing there is a shift tube 10 which is mounted for limited rotation with respect to a pivot axis B within a steering column in a vehicle. This shift tube is rotatable by a manual lever such as that shown in U.S. Pat. No. 3,050,028 to T. J. Griffen et al. between the family of fixed points 12, which reading from right to left respectively correspond to low, second, drive, neutral, reverse and park. Affixed to the outer periphery of the control tube 10 by a suitable adhesive, screws or other fastener means is a radially extending base member 14 of a pointer 16. If desired, the base member 14 may be adjustably mounted on the control tube by a screw and cooperating slot or other suitable adjustment means. The pointer is preferably a one-piece plastic member having an extending pointer portion 18 hinged to the base by appropriately relieving opposite sides of the pointer at 20 to form a live, flexible connection or joint 22.

Figure 2:
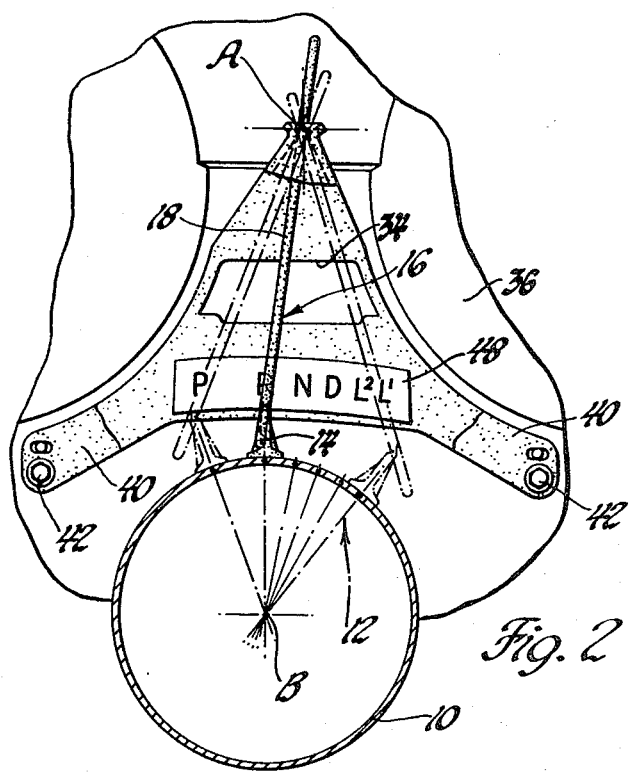
FIG. 2 is a view taken along lines 2—2 of FIG. 1.
Figure 3:
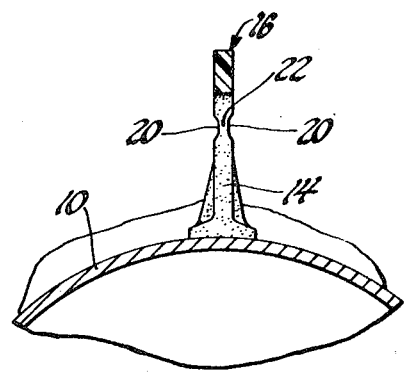
FIG. 3 is a view taken along lines 3—3 of FIG. 1.

As shown in the drawing, the pointer is curved at 26 to enter into the confines of an indicator housing 30 also preferably of plastic material. The indicator housing preferably has spaced front and rear walls with the front wall being partially transparent in a viewing portion 31 to allow observation of the indicator pointer. The pointer extends through the indicator housing from the underside and out through the housing through an upper opening 32 which slidably and pivotally mounts the pointer within the housing for movement with respect to axis A. The indicator housing 30 has a hollow plastic tube 34 projecting from its rear wall for connection with the instrument support panel 36. In the preferred embodiment the projecting end of the tube extends through a suitable opening formed in the support panel and has a peripheral groove 38 formed therein, into which the edge of the panel material defining the opening snugly fits when the indicator housing is installed. For additional support the indicator housing has laterally extending side portions 40 having openings through which suitable retainer bolts 42 extend for connection with the panel 36. There is an electrically energizable lamp 44 disposed behind the panel 36 adjacent to the forward opening of the tube 34 for illuminating the interior of the indicator housing. With the exception of the viewing portion 31 of the indicator housing, the housing interior is preferably painted with a white paint so that the light radiating from lamp 44 will pass through the tube and illuminate the needle 18 and the shift quadrant or dial 48 which may be a decal secured to the forward wall of the indicator housing beneath the supporting tube 34. The shift quadrant may be linear or arcuate or any desired shape. The instrument panel has a front trim plate 50 which extends in front of the indicator housing and has a sight opening 52 through which the shift quadrant 48 and pointer 18 may be observed by the vehicle operator through the field of vision 54. As shown best by FIG. 2 the shift quadrant is suitably marked with appropriate markings $L_1$, $L_2$, D, N, R and P indicative of low, intermediate, drive, neutral, reverse and park respectively.

It will be appreciated that as the transmission control tube 10 is turned by the vehicle operator to select a particular operating range, the indicator pointer will be moved to coincide with a particular letter to inform the operator of the operating mode selected. It will be readily understood from viewing FIG. 2 that the shift quadrant 48 is substantially smaller with this invention as compared to prior art pointers in which the pointer extends as a radial member from the control tube. As the tube 10 is rotated with respect to an axis through point B the flexible joint allows the indicator pointer 18 to assume the positions shown in phantom lines to appropriately indicate transmission operating modes. To provide adequate spacing between the low, intermediate and drive indications on the shift quadrant, point A has been moved to the right of a perpendicular plane through axis B to provide a more centralized point of convergence for the radial lies corresponding to low through reverse extending from the live joint of the pointer. If point A and axis B were coplanar, the spacing between the low and intermediate markings would be small and the dial would be hard to read. It will be appreciated that other types of joints may be used to connect the portions of the indicator pointer together instead of the live joint indicator and other suitable hinges or pivot pins may be used to connect the parts.

This invention is not limited to the details of the construction shown and described for purposes of illustrating the invention for other modifications will occur to those skilled in the art.

What is claimed is:

1. In an indicator for a transmission, an operator member mounted for limited rotation to predetermined stations with respect to a first axis, pointer means for indicating the rotational position of said operator member, hinge means for pivotally connecting said pointer means to said operator member, a housing for said pointer means, dial means disposed in said housing, a series of markings representative of predetermined operating modes of said transmission and corresponding to said predetermined stations of said operator member, and support means defining a second axis disposed outwardly from said series of markings for slidably and pivotally mounting said pointer for limited sweeping movement over said markings with respect to said second axis in response to rotation of said operator member.

2. The indicator defined in claim 1, wherein said markings representative of the forward drive operating modes of said transmission are disposed to one side of a vertical plane through said first axis, and said second axis being disposed at a predetermined point on said one side of said vertical plane to allow optimum separation between said forward drive markings to facilitate observation of said pointer and said forward drive markings.

3. In an indicator mechanism, a control member mounted for limited rotation with respect to a first axis to predetermined positions, a pointer member, hinge means for pivotally connecting one end of said pointer member to said operator member, a housing adjacent to said operator member for accommodating said pointer member, retainer means adjacent to one end of said housing for slidably and pivotally mounting an extending end of said pointer member with respect to a second axis for turning movement within said housing in response to turning movement of said operator member, and said housing being provided with a series of markings which cooperate with said pointer member to indicate the rotational position of said operator member.

4. In a transmission control indicator for an automatic transmission, a manually operable transmission control member mounted in the vehicle for limited rotation with respect to an axis of rotation, a quadrant supported in the vehicle adjacent to said transmission control member, said quadrant having markings thereon corresponding to various positions of said transmission control member to indicate the operating mode of the transmission, indicator means carried by said control member and having an extending end portion, support means disposed outwardly from said quadrant to mount said extending end portion of said indicator means for sliding pivotal movement with respect to a second axis, and said second axis being disposed in a longitudinal plane extending through said quadrant and parallel to a plane containing said first axis.

5. An indicator for an automatic transmission comprising a control tube mounted for limited rotation about a first pivot axis to predetermined stations corresponding to predetermined operating modes of the transmission, indicia means corresponding to said stations and said operating modes of the transmission, pointer means operatively connected to said control tube and movable with respect to said indicia means to cooperate with said indicia means to indicate the operational setting of said transmission by said control tube, said pointer means comprising a base member secured to said control tube and a pointer portion and hinge means connecting said pointer portion to said base member, a housing for said pointer portion and said indicia means, means in said housing for slidably and pivotally mounting said pointer portion therein for limited sweeping movement with respect to said indicia means in response to predetermined turning movement of said control tube, said housing having an elongated supporting portion extending from one side thereof for connection with a housing support member, said supporting portion having an opening therethrough leading from the outside into the interior of said housing to permit the passage of light rays radiating from a source into said housing to illuminate the interior of said housing, and window means in said housing permitting observation of said pointer portion and said indicia means.